US008575283B1

(12) United States Patent
Fang et al.

(10) Patent No.: US 8,575,283 B1
(45) Date of Patent: Nov. 5, 2013

(54) HETEROCYCLIC ORGANIC COMPOUNDS AS ELECTRON DONORS FOR POLYOLEFIN CATALYSTS

(75) Inventors: Yiqun Fang, Port Lavaca, TX (US); Demin Xu, Port Lavaca, TX (US); Ming-Yung Lee, Port Lavaca, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 0 days.

(21) Appl. No.: 13/536,833

(22) Filed: Jun. 28, 2012

(51) Int. Cl.
C08F 4/44 (2006.01)

(52) U.S. Cl.
USPC ...................................... 526/125.3

(58) Field of Classification Search
USPC .......................... 526/126.3, 125.3
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,220,554 A | 9/1980 | Scata et al. |
| 4,226,963 A | 10/1980 | Giannini et al. |
| 4,294,721 A | 10/1981 | Cecchin et al. |
| 4,315,835 A | 2/1982 | Scata' et al. |
| 4,330,649 A | 5/1982 | Kioka et al. |
| 4,347,160 A | 8/1982 | Epstein et al. |
| 4,382,019 A | 5/1983 | Greco |
| 4,435,550 A | 3/1984 | Ueno et al. |
| 4,439,540 A | 3/1984 | Cecchin et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,816,433 A | 3/1989 | Terano et al. |
| 4,978,648 A | 12/1990 | Barbe et al. |
| 5,106,807 A | 4/1992 | Morini et al. |
| 5,208,302 A | 5/1993 | Nakajo et al. |
| 5,407,883 A | 4/1995 | Fushimi et al. |
| 5,684,173 A | 11/1997 | Hosaka et al. |
| 5,902,765 A | 5/1999 | Takahashi et al. |
| 5,948,872 A | 9/1999 | Kioka et al. |
| 6,121,483 A | 9/2000 | Fushimi et al. |
| 6,228,961 B1 | 5/2001 | Grison et al. |
| 6,362,124 B1 | 3/2002 | Kuribayashi et al. |
| 6,436,864 B1 | 8/2002 | Tagge |
| 6,552,136 B1 | 4/2003 | Ota et al. |
| 6,689,849 B1 | 2/2004 | Sadashima et al. |
| 6,770,586 B2 | 8/2004 | Tashino et al. |
| 7,009,015 B2 | 3/2006 | Evain et al. |
| 7,022,640 B2 | 4/2006 | Morini et al. |
| 7,049,377 B1 | 5/2006 | Morini et al. |
| 7,202,314 B2 | 4/2007 | Morini et al. |
| 7,208,435 B2 | 4/2007 | Hosaka et al. |
| 7,223,712 B2 | 5/2007 | Morini et al. |
| 7,244,794 B2 | 7/2007 | Park et al. |
| 7,351,778 B2 | 4/2008 | Gao et al. |
| 7,371,802 B2 | 5/2008 | Gulevich et al. |
| 7,491,781 B2 | 2/2009 | Uhrhammer et al. |
| 7,544,748 B2 | 6/2009 | Gulevich et al. |
| 7,619,049 B1 | 11/2009 | Fang et al. |
| 7,674,741 B2 | 3/2010 | Gulevich et al. |
| 7,674,943 B2 | 3/2010 | Uhrhammer et al. |
| 7,790,819 B1 | 9/2010 | Fang et al. |
| 7,888,437 B2 | 2/2011 | Matsunaga et al. |
| 7,888,438 B2 | 2/2011 | Matsunaga et al. |
| 7,964,678 B2 | 6/2011 | Wang et al. |
| 8,003,558 B2 | 8/2011 | Chang |
| 8,003,559 B2 | 8/2011 | Chang |
| 2009/0171044 A1* | 7/2009 | Spencer ................ 526/125.3 |

OTHER PUBLICATIONS

Schick et al, Condensation of Thiophene and Homologs with Keytones, Journal of the American Chemical Society 1951, vol. 73, p. 1377, U.S.A.

* cited by examiner

*Primary Examiner* — Ling Choi
*Assistant Examiner* — Catherine S Branch
(74) *Attorney, Agent, or Firm* — Jones Walker LLP

(57) ABSTRACT

Heterocyclic organic compounds are used as electron donors in conjunction with solid Ziegler-Natta type catalyst in processes in which polyolefins such as polypropylene are produced. The electron donors may be used in the preparation of solid catalyst system, thus serving as "internal electron donors", or they may be employed during or prior to polymerization with the co-catalyst as "external electron donors".

26 Claims, No Drawings

HETEROCYCLIC ORGANIC COMPOUNDS AS ELECTRON DONORS FOR POLYOLEFIN CATALYSTS

BACKGROUND

1. Field of the Invention

This invention relates to heterocyclic organic compounds that may be employed as an electron donor for polymerization catalyst systems, to polymerization catalyst systems employing the heterocyclic organic compounds as an electron donor, to methods of making such polymerization catalyst systems, and to polymerization processes to produce polyolefins, particularly polypropylene, which does not contain a phthalate derivative.

2. Description of the Related Art

Ziegler-Natta catalyst systems for polyolefin polymerization are well known in the art. Commonly, these systems are composed of a solid Ziegler-Natta catalyst component and a co-catalyst component, usually an organoaluminum compound. To increase the activity and sterospecificity of the catalyst system for the polymerization of α-olefins, electron donating compounds have been widely used (1) as an internal electron donor in the solid Ziegler-Natta catalyst component and/or (2) as an external electron donor to be used in conjunction with the solid Ziegler-Natta catalyst component and the co-catalyst component.

In the utilization of Ziegler-Natta type catalysts for polymerizations involving propylene or other olefins for which isotacticity is a possibility, it may be desirable to utilize an external electron donor, which may or may not be in addition to the use of an internal electron donor. Acceptable external electron donors include organic compounds containing O, Si, N, S, and/or P. Such compounds include organic acids, organic acid esters, organic acid anhydrides, ethers, ketones, alcohols, aldehydes, silanes, amides, amines, amine oxides, thiols, various phosphorus acid esters and amides, etc. Preferred external electron donors are organosilicon compounds containing Si—O—C and/or Si—N—C bonds, having silicon as the central atom. Such compounds are described in U.S. Pat. Nos. 4,472,524; 4,473,660; 4,560,671; 4,581,342; 4,657,882; 5,106,807; 5,407,883; 5,684,173; 6,228,961; 6,362,124; 6,552,136; 6,689,849; 7,009,015; 7,244,794; 7,619,049; and 7,790,819, which are incorporated by reference herein.

Common internal electron donor compounds, incorporated in the solid Ziegler-Natta catalyst component during preparation of such component, known in the prior art, include ethers, ketones, amines, alcohols, phenols, phosphines, and silanes. It is well known in the art that polymerization activity, as well as stereoregularity, molecular weight and molecular weight distribution of the resulting polymer, depend on the molecular structure of the internal electron donor employed. Therefore, in order to improve the polymerization process and the properties of the resulting polymer, there has been an effort and desire to develop various internal electron donors. Examples of such internal electron donor compounds and their use as a component of the catalyst system are described in U.S. Pat. Nos. 4,107,414; 4,186,107; 4,226,963; 4,347,160; 4,382,019; 4,435,550; 4,465,782; 4,522,930; 4,530,912; 4,532,313; 4,560,671; 4,657,882; 5,208,302; 5,902,765; 5,948,872; 6,121,483; 6,436,864; 6,770,586; 7,022,640; 7,049,377; 7,202,314; 7,208,435; 7,223,712; 7,351,778; 7,371,802; 7,491,781; 7,544,748; 7,674,741; 7,674,943; 7,888,437; 7,888,438; 7,964,678; 8,003,558; and 8,003,559, which are incorporated by reference herein.

Most of commercial propylene polymerization catalysts currently used employ alkyl phthalate esters as an internal electron donor. However, certain environmental issues have been recently raised concerning the continued use of phthalate derivatives in human contact applications. As a result, the employment of a phthalate-free propylene polymerization catalyst is now necessary for the production of phthalate-free polypropylene to remedy these issues.

U.S. Pat. No. 7,491,781 in particular teaches the use of an internal donor in a propylene polymerization catalyst component which does not contain a phthalate derivative. However the resulted propylene polymerization catalyst has poorer hydrogen response and lower isotacticity than the catalyst containing a phthalate derivative.

The polypropylene market also has an increasing demand in high melt flow rate (MFR) grade polypropylene to reduce cycle time and to achieve down-gauging while maintaining acceptable impact strength and stiffness. High MFR polypropylene is commonly achieved by adding peroxide to the polymer, but such obtained polypropylene usually has odor issues and the physical properties are sacrificed somehow. As such, production of reactor-grade high MFR polypropylene becomes necessary to avoid these issues.

There is a continuous need for developing catalyst systems that can be used to produce polyolefins, particularly polypropylene, which does not contain a phthalate derivative. Furthermore, the desirable catalyst systems should also offer capabilities to produce poly-propylene with acceptable isotacticity and high MFR.

SUMMARY OF THE INVENTION

This invention relates to heterocyclic organic compounds that may be employed as an electron donor for polymerization catalyst systems, to polymerization catalyst systems employing the heterocyclic organic compounds as an electron donor, to methods of making the polymerization catalyst systems, and to polymerization processes to produce polyolefins, particularly polypropylene, which does not contain a phthalate derivative.

In accordance with various aspects thereof, the present invention relates to a catalyst system for the polymerization or co-polymerization of alpha-olefins comprising a solid Ziegler-Natta type catalyst component, a co-catalyst component, and optionally an external electron donor component. The solid Ziegler-Natta type catalyst component comprises at least one heterocyclic organic compound of this invention. The heterocyclic organic compounds of the present invention that may be used as electron donors in polymerization catalyst systems are represented by Formula I:

[Formula I]

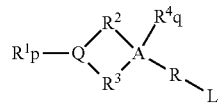

wherein L is represented by Formula II:

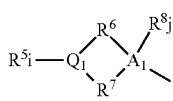

[Formula II]

or is selected from the groups consisting of —OR$^9$, —SR$^9$, —OCOR$^9$, —COOR$^9$, —NH$_2$, —NHR$^9$, —NR$^9{}_2$, and PR$^9{}_2$, wherein R$^9$ is a linear or branch C$_1$-C$_{20}$ alkyl, C$_2$-C$_{20}$ alkenyl, C$_3$-C$_{20}$ cycloalkyl, C$_6$-C$_{20}$ aryl, C$_7$-C$_{20}$ alkylaryl or C$_7$-C$_{20}$ arylalkyl group, optionally containing at least one heteroatom selected from the group consisting of B, Si and halogen atoms. A and A$_1$, which may be identical or different, is a carbon atom or a heteroatom selected from the group consisting of Si, N, B, and P. Q and Q$_1$, which may be identical or different, is a heteroatom selected from the group consisting of O, N, S, and P.

R$^1$, R$^4$, R$^5$, and R$^8$, which may be identical or different, are each a hydrocarbon-based substituent to Q, A, Q$_1$, and A$_1$, respectively. The subscripts p, q, i, and j, depending on the valence state of Q, A, Q$_1$, and A$_1$, are independently 0 or 1, which one of ordinary skill in the art having the benefit of this disclosure will recognize. The length and structure of R$^1$, R$^4$, R$^5$, and R$^8$ are not generally limited. In preferred embodiments of the present invention, R$^1$ and R$^5$ are small groups such as hydrogen, methyl, or ethyl.

Wherein R, R$^2$, R$^3$, R$^6$, and R$^7$, which may be identical or different, are bridging groups with a backbone chain length being 1-6 atoms for R and 0-6 atoms for R$^2$, R$^3$, R$^6$, and R$^7$, with the proviso that the resultant ring structure is a three to eight-membered ring. "Backbone chain length" in this context refers to the atoms that are in the direct linkage between the two atoms Q and A, Q$_1$ and A$_1$, or between the atom A and the group L. For example, if —CH$_2$— or —CH$_2$—CH2- is the bridging group, then the associated backbone chain length is one and two atoms, respectively, referring to the carbon atoms that provide the direct linkage between the two atoms. Similarly, if the bridging group has the iso-structure, CH$_3$CHCH$_2$, then the associated backbone chain length is also two atoms.

The backbone of the bridging group is selected from the group consisting of aliphatic, alicyclic, and aromatic radicals. Preferably, the backbone of the bridging group is selected from the group consisting of aliphatic radicals, with or without unsaturation. The bridging group may have one or more C$_1$-C$_{20}$ substituents (or side chains) extending off the backbone chain. The substituents may be branched or linear and may be saturated or unsaturated. Similarly, the substituents may comprise aliphatic, alicyclic, and/or aromatic radicals.

One or more of carbon atom or hydrogen atom of R$^1$, R$^4$, R$^5$, R$^8$, and bridging groups R, R$^2$, R$^3$, R$^6$, and R$^7$, including any substituents thereof, may be replaced with a heteroatom selected from the group consisting of O, N, S, P, B, Si, and halogen atoms, with the proviso that O, N, S, and P can only be embedded in the ring structure or in the backbone atoms of R.

In various embodiments of the present invention, two or more of said R, R$^1$, R$^2$, R$^3$, R$^4$, R$^5$, R$^6$, R$^7$, or R$^8$ may be linked to form one or more saturated or unsaturated monocyclic or polycyclic rings.

In various embodiments of the present invention, when the backbone of R group is a single carbon atom, either A or A$_1$ cannot be connected to a nitrogen atom to form a carbon nitrogen double bond.

In accordance with various aspects thereof, the present invention also relates to a composition containing a compound of the heterocyclic organic compound of the aforementioned formula. In accordance with various aspects thereof, the present invention also relates to a method of polymerizing an alpha-olefin comprising polymerizing the alpha-olefin in the presence of the heterocyclic organic compound of the aforementioned formula.

DESCRIPTION OF PREFERRED EMBODIMENTS

This invention relates to heterocyclic organic compounds that may be employed as an electron donor for polymerization catalyst systems, to polymerization catalyst systems employing the heterocyclic organic compounds as an electron donor, to methods of making such polymerization catalyst systems, and to polymerization processes to produce polyolefins, particularly polypropylene, which does not contain a phthalate derivative.

In accordance with various embodiments, a class of heterocyclic organic compounds, which are useful as electron donors in polymerization catalyst systems for the production of polyolefins, particularly polypropylene, are disclosed. These heterocyclic organic compounds may be used as either an internal electron donor or an external electron donor. Preferably, these heterocyclic organic compounds are used as an internal electron donor. Polymerization catalyst systems employing the heterocyclic organic compounds of the present invention may have an internal electron donor, an external electron donor, or both an internal electron donor and an external electron donor.

The heterocyclic organic compounds of the present invention may be used alone as a single constituent as the electron donor component of the catalyst system or may be used in combination with one or more other compounds as an electron donor component of the catalyst system. If more than one compound is used as the electron donor component, one or more of the constituents may be heterocyclic organic compounds of the present invention.

The heterocyclic organic compounds of the present invention that may be used as electron donors in polymerization catalyst systems are represented by Formula I:

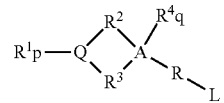

[Formula I]

wherein L is represented by Formula II:

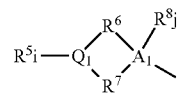

[Formula II]

or is selected from the groups consisting of —OR$^9$, —SR$^9$, —OCOR$^9$, —COOR$^9$, —NH$_2$, —NHR$^9$, —NR$^9{}_2$, and PR$^9{}_2$, wherein R$^9$ is a linear or branch C$_1$-C$_{20}$ alkyl, C$_2$-C$_{20}$ alkenyl, C$_3$-C$_{20}$ cycloalkyl, C$_6$-C$_{20}$ aryl, C$_7$-C$_{20}$ alkylaryl or C$_7$-C$_{20}$ arylalkyl group, optionally containing at least one heteroatom selected from the group consisting of B, Si and halogen atoms. A and A$_1$, which may be identical or different, is a carbon atom or a heteroatom selected from the group consisting of Si, N, B, and P. Q and $Q_1$, which may be identical or different, is a heteroatom selected from the group consisting of O, N, S and P.

$R^1$, $R^4$, $R^5$, and $R^8$, which may be identical or different, are each a hydrocarbon-based substituent to Q, A, $Q_1$, and $A_1$, respectively. The subscripts p, q, i, and j, depending on the valence state of Q, A, $Q_1$, and $A_1$ are independently 0 or 1, which one of ordinary skill in the art having the benefit of this disclosure will recognize. The length and structure of $R^1$, $R^4$, $R^5$, and $R^8$ are not generally limited. In preferred embodiments of the present invention, $R^1$ and $R^5$ are small groups such as hydrogen, methyl, or ethyl.

R, $R^2$, $R^3$, $R^6$, and $R^7$, which may be identical or different, are bridging groups with a backbone chain length being 1-6 atoms for R and 0-6 atoms for $R^2$, $R^3$, $R^6$, and $R^7$, with the proviso that the resulted ring structure is a three to eight-membered ring. "Backbone chain length" in this context refers to the atoms that are in the direct linkage between the two atoms Q and A, $Q_1$ and $A_1$, or between the atom A and the group L. For example, if —$CH_2$— or —$CH_2$—CH2- is the bridging group then the associated backbone chain length is one and two atoms, respectively, referring to the carbon atoms that provide the direct linkage between the two atoms. Similarly, if the bridging group has the iso-structure, $CH_3CHCH_2$, then the associated backbone chain length is also two atoms.

The backbone of the bridging group is selected from the group consisting of aliphatic, alicyclic, and aromatic radicals. Preferably, the backbone of the bridging group is selected from the group consisting of aliphatic radicals, with or without unsaturation. The bridging group may have one or more $C_1$-$C_{20}$ substituents (or side chains) extending off the backbone chain. The substituents may be branched or linear and may be saturated or unsaturated. Similarly, the substituents may comprise aliphatic, alicyclic, and/or aromatic radicals.

One or more of carbon atom or hydrogen atom of $R^1$, $R^4$, $R^5$, $R^8$, and bridging groups R, $R^2$, $R^3$, $R^6$, and $R^7$, including any substituents thereof, may be replaced with a heteroatom selected from the group consisting of O, N, S, P, B, Si, and halogen atoms with the proviso that O, N, S, and P can only be embedded in the ring structure or in the backbone atoms of R.

In various embodiments of the present invention, two or more of said R, $R^1$, $R^2$, $R^3$, $R^4$, $R^5$, $R^6$, $R^7$, or $R^8$ may be linked to form one or more saturated or unsaturated monocyclic or polycyclic rings.

In various embodiments of the present invention, when the backbone of R group is a single carbon atom, either A or $A_1$ cannot be connected to a nitrogen atom to form a carbon nitrogen double bond.

Examples of suitable heterocyclic organic compounds of the Formula I include, but are not limited to:

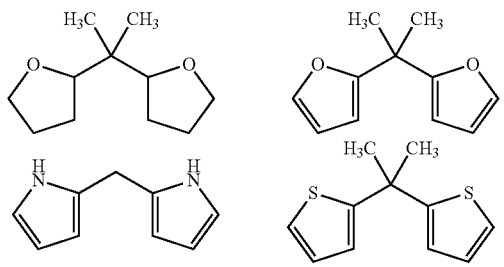

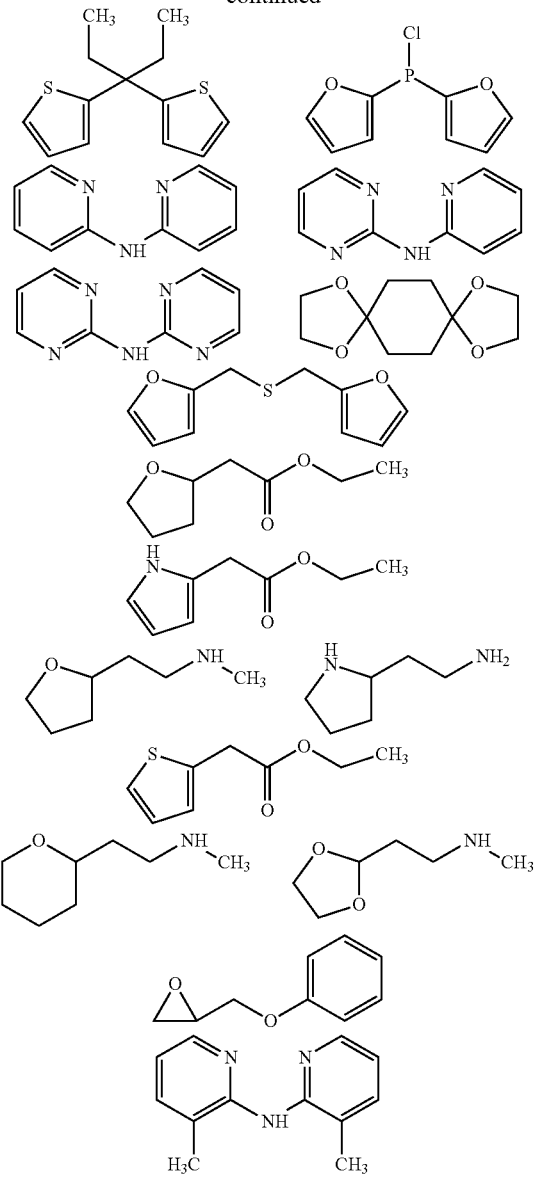

The heterocyclic organic compounds of the present invention may be used as a component in Ziegler-Natta type catalyst systems. Except for the inclusion of the heterocyclic organic compounds of the present invention, the Ziegler-Natta type catalyst systems, and methods for making such catalyst systems, which may be employed in accordance with the various embodiments of the present invention, are not generally limited. Typical, and acceptable, Ziegler-Natta type catalyst systems that may be used in accordance with the present invention comprise (a) a solid Ziegler-Natta type catalyst component, and (b) a co-catalyst component, and optionally (c) one or more external electron donors. In accordance with the various embodiments of the present invention, at least one heterocyclic organic compound in accordance with the present invention is used as an electron donor in the Ziegler-Natta type catalyst system. As previously disclosed herein, these heterocyclic organic compounds may be used as either an internal electron donor or an external electron donor. Preferably, these heterocyclic organic compounds are used as an internal electron donor.

Preferred solid Ziegler-Natta type catalyst component (a) include solid catalyst components comprising a titanium compound having at least a Ti-halogen bond and an internal electron donor compound supported on an anhydrous magnesium-dihalide support. Such preferred solid Ziegler-Natta type catalyst component (a) include solid catalyst components comprising a titanium tetrahalide. A preferred titanium tetrahalide is $TiCl_4$. Alkoxy halides may also be used.

If the heterocyclic organic compounds of the present invention are used in combination with one or more other compounds as an internal electron donor component of the catalyst system, the acceptable additional internal electron donor compounds for the preparation of solid Ziegler-Natta type catalyst component (a) are not generally limited and include, but are not limited to, alkyl, aryl, and cycloalkyl esters of aromatic acids, in particular the alkyl esters of benzoic acid and phthalic acid and their derivatives. Examples of such compounds include ethyl benzoate, n-butyl benzoate, methyl-p-toluate, and methyl-p-methoxybenzoate and diisobutylphthalate. Other common internal electron donors, including alkyl or alkyl-aryl ethers, ketones, mono- or polyamines, aldehydes, and P-compounds, such as phosphines and phosphoramides, may also be used.

Acceptable anhydrous magnesium dihalides forming the support of the solid Ziegler-Natta type catalyst component (a) are the magnesium dihalides in active form that are well known in the art. Such magnesium dihalides may be preactivated, may be activated in situ during the titanation, may be formed in-situ from a magnesium compound, which is capable of forming magnesium dihalide when treated with a suitable halogen-containing transition metal compound, and then activated. Preferred magnesium dihalides are magnesium dichloride and magnesium dibromide. The water content of the dihalides is generally less than 1% by weight.

The solid Ziegler-Natta type catalyst component (a) may be made by various methods. One such method consists of co-grinding the magnesium dihalide and the internal electron donor compound until the product shows a surface area higher than 20 $m^2$/g and thereafter reacting the ground product with the Ti compound. Other methods of preparing solid Ziegler-Natta type catalyst component (a) are disclosed in U.S. Pat. Nos. 4,220,554; 4,294,721; 4,315,835; 4,330,649; 4,439,540; 4,816,433; and 4,978,648. These methods are incorporated herein by reference.

In a typical solid Ziegler-Natta type catalyst component (a), the molar ratio between the magnesium dihalide and the halogenated titanium compound is between 1 and 500 and the molar ratio between said halogenated titanium compound and the internal electron donor is between 0.1 and 50.

Preferred co-catalyst component (b) include aluminum alkyl compounds. Acceptable aluminum alkyl compounds include aluminum trialkyls, such as aluminum triethyl, aluminum triisobutyl, and aluminum triisopropyl. Other acceptable aluminum alkyl compounds include aluminum-dialkyl hydrides, such as aluminum-diethyl hydrides. Other acceptable co-catalyst component (b) include compounds containing two or more aluminum atoms linked to each other through hetero-atoms, such as:

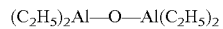

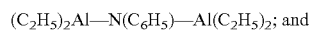

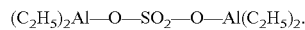

Acceptable external electron donor component (c) is organic compounds containing O, Si, N, S, and/or P. Such compounds include organic acids, organic acid esters, organic acid anhydrides, ethers, ketones, alcohols, aldehydes, silanes, amides, amines, amine oxides, thiols, various phosphorus acid esters and amides, etc. Preferred component (c) is organosilicon compounds containing Si—O—C and/or Si—N—C bonds. Special examples of such organosilicon compounds are trimethylmethoxysilane, diphenyldimethoxysilane, cyclohexylmethyldimethoxysilane, diisopropyldimethoxysilane, dicyclopentyldimethoxysilane, isobutyltriethoxysilane, vinyltrimethoxysilane, dicyclohexyldimethoxysilane, 3-tert-Butyl-2-isobutyl-2-methoxy-[1,3,2]oxazasilolidine, 3-tert-Butyl-2-cyclopentyl-2-methoxy-[1,3,2]oxazasilolidine, 2-Bicyclo[2.2.1]hept-5-en-2-yl-3-tert-butyl-2-methoxy-[1,3,2]oxazasilolidine, 3-tert-Butyl-2,2-diethoxy-[1,3,2]oxazasilolidine, 4,9-Di-tert-butyl-1,6-dioxa-4,9-diaza-5-sila-spiro[4.4]nonane, bis(perhydroisoquinolino)dimethoxysilane, etc. Mixtures of organic electron donors may also be used. Finally, the heterocyclic organic compounds of the present invention may also be employed as an external electronic donor.

The olefin polymerization processes that may be used in accordance with the present invention are not generally limited. For example, the catalyst components (a), (b) and (c), when employed, may be added to the polymerization reactor simultaneously or sequentially. It is preferred to mix components (b) and (c) first and then contact the resultant mixture with component (a) prior to the polymerization.

The olefin monomer may be added prior to, with, or after the addition of the Ziegler-Natta type catalyst system to the polymerization reactor. It is preferred to add the olefin monomer after the addition of the Ziegler-Natta type catalyst system.

The molecular weight of the polymers may be controlled in a known manner, preferably by using hydrogen. With the catalysts produced according to the present invention, molecular weight may be suitably controlled with hydrogen when the polymerization is carried out at relatively low temperatures, e.g., from about 30° C. to about 105° C. This control of molecular weight may be evidenced by a measurable positive change of the Melt Flow Rate.

The polymerization reactions may be carried out in slurry, liquid or gas phase processes, or in a combination of liquid and gas phase processes using separate reactors, all of which may be done either by batch or continuously. The polyolefin may be directly obtained from gas phase process, or obtained by isolation and recovery of solvent from the slurry process, according to conventionally known methods.

There are no particular restrictions on the polymerization conditions for production of polyolefins by the method of this invention, such as the polymerization temperature, polymerization time, polymerization pressure, monomer concentration, etc. The polymerization temperature is generally from 40-90° C. and the polymerization pressure is generally 1 atmosphere or higher.

The Ziegler-Natta type catalyst systems of the present invention may be precontacted with small quantities of olefin monomer, well known in the art as prepolymerization, in a hydrocarbon solvent at a temperature of 60° C. or lower for a time sufficient to produce a quantity of polymer from 0.5 to 3 times the weight of the catalyst. If such a prepolymerization is done in liquid or gaseous monomer, the quantity of resultant polymer is generally up to 1000 times the catalyst weight.

The Ziegler-Natta type catalyst systems of the present invention are useful in the polymerization of olefins, including but not limited to homopolymerization and copolymerization of alpha olefins. Suitable α-olefins that may be used in a polymerization process in accordance with the present invention include olefins of the general formula $CH_2$=CHR, where R is H or $C_{1-10}$ straight or branched alkyl, such as ethylene, propylene, butene-1, pentene-1,4-methylpentene-1 and octene-1. While the Ziegler-Natta type catalyst systems of the present invention may be employed in processes in which ethylene is polymerized, it is more desirable to employ the Ziegler-Natta type catalyst systems of the present invention in processes in which polypropylene or higher olefins are polymerized. Processes involving the homopolymerization or copolymerization of propylene are preferred.

EXAMPLES

In order to provide a better understanding of the foregoing discussion, the following non-limiting examples are offered. Although the examples may be directed to specific embodiments, they are not to be viewed as limiting the invention in any specific respect. The activity values (AC) in TABLE 1 are based upon grams of polymer produced per gram of solid catalyst component used.

The following analytical methods are used to characterize the polymer.

Xylene soluble components (XS): 5.0 g of the polymer was added to 500 ml of xylenes (bp: 137~140° C.) and dissolved while maintaining the mixture at the boiling point over one hour. The mixture was cooled down to 5° C. within 20 minutes in an ice-water bath. Thereafter the ice-water bath was replaced with a 20° C. water bath and the mixture was equilibrated at 20° C. for 30 minutes. The soluble matters were separated from insoluble matters by filtration. The soluble components were dried with heating, and the polymer thus obtained was determined as xylene soluble components (wt %).

Melt Flow Rate: ASTM D-1238, determined at 230° C., under a load of 2.16 kg.

Molecular Weight (Mn and Mw): The weight average molecular weight (Mw), number average molecular weight (Mn), and molecular weight distribution (Mw/Mn) of polymers are obtained by gel permeation chromatography on Waters GPCV 2000 system using Polymer Labs Plgel 10 um MIXED-B LS 300×7.5 mm columns and 1,2,4-trichlorobenzene (TCB) as the mobile phase. The mobile phase is set at 1.0 ml/min, and temperature is set at 145° C. Polymer samples are heated at 150° C. for two hours. The injection volume is 299 microliters. External standard calibration of polystyrene narrow standards is used to calculate the molecular weight.

Magnesium ethoxide (98%), anhydrous toluene (99.8%), $TiCl_4$ (99.9%), anhydrous n-heptane (99%), 2,2-dipyridylamine (99%), diisobutyl phthalate (99%), cyclohexyl (dimethoxy)methylsilane (C-donor) (≥99%) and triethylaluminum (93%) were all purchased from Sigma-Aldrich Co. of Milwaukee, Wis., USA.

2,2'-Di(2-tetrahydrofuryl)propane [>96% (GC)], 2,2'-di(2-furyl)propane [>98.8% (GC)] and 2,2'-dipyrrolymethane [>97% (GC)] and ethyl Tetrahydrofuran-2-acetate [>98.0% (GC)] were purchased from TCI America.

Diisopropyldimethoxysilane (P-donor) was purchased from Gelest, Inc. of Morrisville, Pa., USA.

Unless otherwise indicated, all reactions were conducted under an inert atmosphere.

Example 1

(A) The Preparation of a Solid Catalyst Component

A 250 ml flask equipped with a stirrer and thoroughly purged with nitrogen was charged with 10 g of magnesium ethoxide and 100 ml of anhydrous toluene to form a suspension. To the suspension was injected 25 ml of $TiCl_4$ and was then heated up to a temperature of 90° C. 1.8 g of 2,2-di(2-tetrahydrofuryl)propane was added thereto, followed by heating up to 110° C. with agitation at that temperature for 2 hours. After the completion of the reaction, the product was washed twice with 100 ml of anhydrous toluene at 90° C., and 100 ml of fresh anhydrous toluene and 25 ml of $TiCl_4$ were added thereto for reacting with agitation at 110° C. for two additional hours. After the completion of the reaction, the product was washed 8 times with 200 ml of anhydrous n-heptane at 90° C. and was dried under a reduced pressure to obtain a solid composition.

(B) Polymerization

A bench scale 2-liter reactor was used. The reactor was first preheated to at least 100° C. with a nitrogen purge to remove residual moisture and oxygen. The reactor was thereafter cooled to 50° C.

Under nitrogen, 1 liter dry heptane was introduced into the reactor. When reactor temperature was about 50° C., 4.3 ml triethylaluminum (0.58M, in hexanes), 0.40 ml cyclohexyl(dimethoxy)methylsilane (C-donor) (0.5 M in heptane), and then 30 mg of the solid catalyst component prepared above were added to the reactor. The pressure of the reactor was raised to 28.5 psig at 50° C. by introducing nitrogen. 8 psi hydrogen in a 150 cc vessel was flushed into the reactor with propylene.

The reactor temperature was then raised to 70° C. The total reactor pressure was raised to and controlled at 90 psig by continually introducing propylene into the reactor and the polymerization was allowed to proceed for 1 hour. After polymerization, the reactor was vented to reduce the pressure to 0 psig and the reactor temperature was cooled to 50° C.

The reactor was then opened. 500 ml methanol was added to the reactor and the resulting mixture was stirred for 5 minutes then filtered to obtain the polymer product. The obtained polymer was vacuum dried at 80° C. for 6 hours. The polymer was evaluated for melt flow rate (MFR), Xylene soluble (% XS), and molecular weight distribution (Mw/Mn). The activity of catalyst (AC) was also measured. The results are shown in TABLE 1.

Example 2

The preparation of a solid catalyst component was carried out under the same conditions as Example 1 except that 0.85 g of 2,2-di(2-furyl)propane was used in place of 2,2-di(2-tetrahydrofuryl)propane.

Propylene polymerization was carried out in the same manner as described in Example 1. The results are shown in TABLE 1.

Example 3

The preparation of a solid catalyst component was carried out under the same conditions as Example 1 except that 1.03 g of 2,2'-dipyrrolylmethane was used in place of 2,2-di(2-tetrahydrofuryl)propane.

Propylene polymerization was carried out in the same manner as described in Example 1 except that 8.6 ml triethylaluminum (0.58M), 0.80 ml cyclohexyl(dimethoxy)methylsilane (C-donor) (0.5 M in heptane), and then 60 mg of the solid catalyst component were added to the reactor instead. The results are shown in TABLE 1.

Example 4

The preparation of a solid catalyst component was carried out under the same conditions as Example 1 except that 1.7 g of 2,2'-dipyridylamine was used in place of 2,2-di(2-tetrahydrofuryl)propane.

Propylene polymerization was carried out in the same manner as described in Example 1. The results are shown in TABLE 1.

Example 5

The preparation of a solid catalyst component was carried out under the same conditions as Example 1 except that magnesium ethoxide (6.0 g) and 1.38 g of 2,2-di(2-thiophenyl)propane [>98.0% (GC), prepared according to the procedure described in Journal of the American Chemical Society 1951, 73, 1377.] were used in place of 10 g magnesium ethoxide and 1.8 g of 2,2-di(2-tetrahydrofuryl)propane.

Propylene polymerization was carried out in the same manner as described in Example 1. The results are shown in TABLE 1.

Example 6

The preparation of a solid catalyst component was carried out under the same conditions as Example 1 except that 2.0 g of ethyl tetrahydrofuran-2-acetate was used in place of 2,2-di(2-tetrahydrofuryl)propane.

Propylene polymerization was carried out in the same manner as described in Example 1 except that 0.4 ml diisopropyldimethoxysilane (P-donor) (0.5 M in Heptane) was used in place of cyclohexyl(dimethoxy)methylsilane (C-donor). The results are shown in TABLE 1.

Comparative Example 1

The preparation of a solid catalyst component was carried out under the same conditions as Example 1 except that 2.7 ml of diisobutyl phthalate was used in place of 2,2-di(2-tetrahydrofuryl)propane.

Propylene polymerization was carried out in the same manner as described in Example 1. The results are shown in TABLE 1.

Comparative Example 2

The solid catalyst component prepared in Comparative Example 1 was used here for the propylene polymerization which was carried out in the same manner as described in Example 1 except that 0.4 ml diisopropyldimethoxysilane (P-donor) (0.5 M in Heptane) was used in place of cyclohexyl (dimethoxy)methylsilane (C-donor). The results are shown in TABLE 1.

TABLE 1

| Examples | Internal donor | External donor | AC (gPP/gCat) | MFR (g/10 min) | XS (%) | Mw/Mn |
|---|---|---|---|---|---|---|
| Ex. 1 | 2,2-Di(2-tetrahydrofuryl)propane | C-donor | 2557 | 17 | 1.8 | 5.4 |
| Ex. 2 | 2,2-Di(2-furyl)propane | C-donor | 1219 | 15 | 1.4 | 5.0 |
| Ex. 3 | 2,2'-Dipyrrolylmethane | C-donor | 1065 | 5.5 | 2.4 | 6.2 |
| Ex. 4 | 2,2'-Dipyridylamine | C-donor | 1893 | 18 | 1.7 | 4.7 |
| Ex. 5 | 2,2-Di(2-thiophenyl)propane | C-donor | 2100 | 16 | 3.4 | 5.1 |
| Com. Ex. 1 | Di-iso-butyl phthalate | C-donor | 2615 | 8 | 1.6 | 5.3 |
| Ex. 6 | Ethyl Tetrahydrofuran-2-acetate | P-donor | 1487 | 15 | 3.3 | 4.9 |
| Com. Ex 2 | Di-iso-butyl phthalate | P-donor | 2896 | 4.2 | 1.1 | 5.5 |

As shown from the above results, the present inventive catalyst systems can be used to produce polyolefins, particularly polypropylene, which does not contain a phthalate derivative. Furthermore, the present inventive catalyst systems also offer capabilities to produce polypropylene with acceptable isotacticity and high MFR.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Whenever a numerical range with a lower limit and an upper limit is disclosed, any number falling within the range is specifically disclosed. Moreover, the indefinite articles "a" or "an", as used in the claims, are defined herein to mean one or more than one of the element that it introduces.

What is claimed is:

1. A solid catalyst component for the polymerization or co-polymerization of alpha-olefins comprising titanium, magnesium, halogen and at least one internal electron donor selected from heterocyclic organic compounds of:

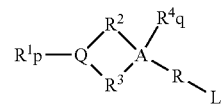

wherein L is represented by:

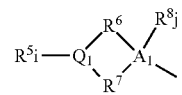

wherein A and $A_1$, which may be identical or different, is a carbon atom or a heteroatom selected from the group consisting of Si, N, B, and P;

wherein Q and $Q_1$, which may be identical or different, is a heteroatom selected from the group consisting of O, N, S, and P;

wherein $R^1$, $R^4$, $R^5$, and $R^8$, which may be identical or different, are aliphatic, alicyclic or aromatic groups;

wherein the subscripts p, q, i, and j are independently selected from 0 or 1;

wherein the bonds directly connected to Q, A, $Q_1$, and $A_1$, are independently a single bond or a double bond;

wherein R, $R^2$, $R^3$, $R^6$, and $R^7$, which may be identical or different, are bridging groups with a backbone chain length being 1-6 atoms for R and 0-6 atoms for $R^2$, $R^3$, $R^6$, and $R^7$, wherein the resultant ring structure is a three to eight-membered ring.

2. The solid catalyst component of claim 1, wherein the backbone of the bridging groups is selected from the group consisting of aliphatic, alicyclic, and aromatic radicals.

3. The solid catalyst component of claim 1, wherein either A or $A_1$ cannot be connected to a nitrogen atom to form a carbon nitrogen double bond when the backbone of R group is a single carbon atom.

4. The solid catalyst component of claim 1, wherein $R^1$ and $R^5$ is selected from the group consisting of hydrogen, methyl, and ethyl.

5. The solid catalyst component of claim 1, wherein R, $R^2$, $R^3$, $R^6$, and $R^7$ independently comprise $C_1$-$C_{20}$ linear and/or branched substituents.

6. The solid catalyst component of claim 1, wherein two or more of said R, $R^1$, $R^2$, $R^3$, $R^4$, $R^5$, $R^6$, $R^7$, and $R^8$ may be linked to form one or more saturated or unsaturated monocyclic or polycyclic rings.

7. The solid catalyst component of claim 1, wherein at least one of a carbon atom or hydrogen atom of R may be replaced by a heteroatom selected from the group consisting of O, N, S, P, B, Si, and halogen atoms, wherein O, N, S, and P can only be embedded in the backbone of the bridging groups.

8. The solid catalyst component of claim 1, wherein at least one of a carbon atom or hydrogen atom of $R^1$, $R^2$, $R^3$, $R^4$, $R^5$, $R^6$ $R^7$, and $R^8$ may be replaced by a heteroatom selected from the group consisting of O, N, S, P, B, Si, and halogen atoms, wherein O, N, S, and P can only be embedded in the ring structure.

9. A catalyst system for the polymerization or co-polymerization of alpha-olefins comprising:
(1) a solid catalyst component for the polymerization or co-polymerization of alpha-olefin comprising titanium, magnesium, halogen and at least one internal electron donor selected from heterocyclic organic compounds of:

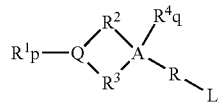

wherein L is represented by:

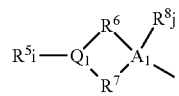

wherein A and $A_1$, which may be identical or different, is a carbon atom or a heteroatom selected from the group consisting of Si, N, B, and P;
wherein Q and $Q_1$, which may be identical or different, is a heteroatom selected from the group consisting of O, N, S, and P;
wherein $R^1$, $R^4$, $R^5$, and $R^8$, which may be identical or different, are aliphatic, alicyclic or aromatic groups;
wherein the subscripts p, q, i, and j are independently selected from 0 or 1;
wherein the bonds directly connected to Q, A, $Q_1$, and $A_1$, are independently a single bond or a double bond;
wherein R, $R^2$, $R^3$, $R^6$, and $R^7$, which may be identical or different, are bridging groups with a backbone chain length being 1-6 atoms for R and 0-6 atoms for $R^2$, $R^3$, $R^6$, and $R^7$, wherein the resultant ring structure is a three to eight-membered ring;
(2) a co-catalyst component.

10. The catalyst system of claim 9, further comprising one or more external electron donor components.

11. The catalyst system of claim 9, wherein the backbone of the bridging groups is selected from the group consisting of aliphatic, alicyclic, and aromatic radicals.

12. The catalyst system of claim 9, wherein either A or $A_1$ cannot be connected to a nitrogen atom to form a carbon nitrogen double bond when the backbone of R group is a single carbon atom.

13. The catalyst system of claim 9, wherein $R^1$ and $R^5$ is selected from the group consisting of hydrogen, methyl, and ethyl.

14. The catalyst system of claim 9, wherein R, $R^2$, $R^3$, $R^6$, and $R^7$ independently comprise $C_1$-$C_{20}$ linear and/or branched substituents.

15. The catalyst system of claim 9, wherein two or more of said R, $R^1$, $R^2$, $R^3$, $R^4$, $R^5$, $R^6$, $R^7$, and $R^8$ may be linked to form one or more saturated or unsaturated monocyclic or polycyclic rings.

16. The catalyst system of claim 9, wherein at least one of a carbon atom or hydrogen atom of R may be replaced by a heteroatom selected from the group consisting of O, N, S, P, B, Si, and halogen atoms, wherein O, N, S, and P can only be embedded in the backbone of the bridging groups.

17. The catalyst system of claim 9, wherein at least one of a carbon atom or hydrogen atom of $R^1$, $R^2$, $R^3$, $R^4$, $R^5$, $R^6$ $R^7$, and $R^8$ may be replaced by a heteroatom selected from the group consisting of O, N, S, P, B, Si, and halogen atoms, wherein O, N, S, and P can only be embedded in the ring structure.

18. A method for polymerizing alpha-olefins, comprising polymerizing alpha-olefins in the presence of:
(1) a solid catalyst component for the polymerization or co-polymerization of alpha-olefin comprising titanium, magnesium, halogen and at least one internal electron donor selected from heterocyclic organic compounds:

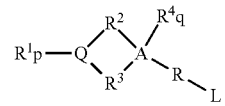

wherein L is represented by:

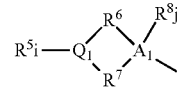

wherein A and $A_1$, which may be identical or different, is a carbon atom or a heteroatom selected from the group consisting of Si, N, B, and P;
wherein Q and $Q_1$, which may be identical or different, is a heteroatom selected from the group consisting of O, N, S, and P;
wherein $R^1$, $R^4$, $R^5$, and $R^8$, which may be identical or different, are aliphatic, alicyclic or aromatic groups;
wherein the subscripts p, q, i, and j are independently selected from 0 or 1;

wherein the bonds directly connected to Q, A, $Q_1$, and $A_1$, are independently a single bond or a double bond;

wherein R, $R^2$, $R^3$, $R^6$, and $R^7$, which may be identical or different, are bridging groups with a backbone chain length being 1-6 atoms for R and 0-6 atoms for $R^2$, $R^3$, $R^6$, and $R^7$, wherein the resultant ring structure is a three to eight-membered ring;

(2) a co-catalyst component.

19. The method of claim 18, further comprising one or more external electron donor components.

20. The method of claim 18, wherein the backbone of the bridging groups is selected from the group consisting of aliphatic, alicyclic, and aromatic radicals.

21. The method of claim 18, wherein either A or $A_1$ cannot be connected to a nitrogen atom to form a carbon nitrogen double bond when the backbone of R group is a single carbon atom.

22. The method of claim 18, wherein $R^1$ and $R^5$ is selected from the group consisting of hydrogen, methyl, and ethyl.

23. The method of claim 18, wherein R, $R^2$, $R^3$, $R^6$, and $R^7$ independently comprise $C_1$-$C_{20}$ linear and/or branched substituents.

24. The method of claim 18, wherein two or more of said R, $R^1$, $R^2$, $R^3$, $R^4$, $R^5$, $R^6$, $R^7$, and $R^8$ may be linked to form one or more saturated or unsaturated monocyclic or polycyclic rings.

25. The method of claim 18, wherein at least one of a carbon atom or hydrogen atom of R may be replaced by a heteroatom selected from the group consisting of O, N, S, P, B, Si, and halogen atoms, wherein O, N, S, and P can only be embedded in the backbone of the bridging groups.

26. The method of claim 18, wherein at least one of a carbon atom or hydrogen atom of $R^1$, $R^2$, $R^3$, $R^4$, $R^5$, $R^6$, $R^7$, and $R^8$ may be replaced by a heteroatom selected from the group consisting of O, N, S, P, B, Si, and halogen atoms, wherein O, N, S, and P can only be embedded in the ring structure.

* * * * *